United States Patent Office 2,928,865
Patented Mar. 15, 1960

2,928,865

FLUORINATED TRICYCLONONANES AND TETRACYCLOUNDECANES

Wallace R. Brasen, Claymont, Del., assignor to E. I. du Pont de Nemours and Company, Wilmington, Del., a corporation of Delaware No Drawing. Application March 25, 1957
Serial No. 647,940

7 Claims. (Cl. 260—464)

This invention relates to polyfluoro-polycyclic alkanes and alkenes and to their preparation. In particular, it relates to polyfluoro-tricyclic alkenes and their conversion to polyfluorobutadienes.

Fluorine-containing compounds have achieved prominence in recent years because of unusual physical and chemical properties. Principal attention has been given to fluorine-containing straight chain compounds, because of their thermal stability, and to fluoroolefins and diolefins which can be converted to valuable polymers. There is little or no knowledge of fluorine-containing polycyclic compounds and of their use in preparing fluoroolefins.

It is an object of the invention to prepare novel polycyclic fluorine-containing compounds. It is a further object to prepare compounds which can be used as degreasing agents for metals and, alone or in combination with gasoline, can be used as solvents for removing gummy deposits and as spotting agents for fabrics. Still a further object is to prepare polycyclic fluorine-containing compounds useful as heat exchange media.

New fluorine-containing compounds have now been obtained which are polycyclic compounds having three or four fused rings and nine or eleven ring carbon atoms. This class of compounds has two five-membered rings with three carbons in common with two of the non-common carbons of one of the five-membered rings (and optionally, also, two of the non-common carbons of the other five-membered ring) forming with two additional carbons a four-membered ring in which one of the said two additional carbons is bonded to two fluorine atoms, the other of the two additional carbons being bonded to (1) at least one of the following: a halogen of atomic number 9 through 35, an omega-hydroperfluoroalkyl group or a perfluoroalkyl group, said groups having no more than 10 carbons and (2) at most one of the following: hydrogen, an alkyl group, or a haloalkyl group wherein the halogen is of atomic number no greater than 35, in which said alkyl and haloalkyl groups have at most 10 carbons. The compounds include tricyclic and tetracyclic products which can be described as 3,3-difluorotricyclo[4.2.1.0$^{2,5}$]-nonanes and nonenes and 3,3-difluorotetracyclo

[4.4.1.0$^{2,5}$0$^{7,10}$]

undecanes.

These compounds have the general structure:

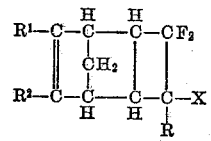
(Formula I)

where R$^1$, R$^2$, R$^3$ and R$^4$ are hydrogen, hydrocarbon groups, carboxyl groups or groups hydrolyzable thereto, R$^2$ and R$^3$ can together represent the divalent group, —[CF$_2$—CX(R)]—$_n$, where $n$ is 0 or 1, that is, when $n$=0, R$^2$ and R$^3$ form together one-half a double bond; wherein X is a halogen of atomic number no greater than 35, an omega-hydroperfluoroalkyl group of no more than 10 carbons or a perfluoroalkyl group of no more than 10 carbons; and R is X, hydrogen, an alkyl group or a haloalkyl group wherein the halogen is of atomic number no greater than 35, in which said alkyl and haloalkyl groups have at most 10 carbons. Preferably R is hydrogen or has the same significance as X. Where R$^1$, R$^2$, R$^3$ or R$^4$ are hydrocarbon they preferably contain not more than 12 carbon atoms and can be aliphatic, cycloaliphatic, aralkyl and aryl.

The preferred compounds of the invention are 3,3-difluoro-4-halotricyclo[4.2.1.0$^{2,5}$]nonanes and nonenes. In this class of compounds R in Formula I is a halogen of atomic number 9 through 35; R$^1$ and R$^4$ are hydrogen, hydrocarbon groups, carboxyl groups or groups hydrolyzable thereto; R$^2$ and R$^3$ are hydrogen or may together represent a carbon-to-carbon bond; X has the meaning described previously. These compounds are preferred because of availability or ease of preparation of the reactants used in the process.

In an especially preferred embodiment of the invention the compounds are described as 3,3-difluoro-4-halotricyclo-[4.2.1.0$^{2,5}$]non-7-enes which have the general structure:

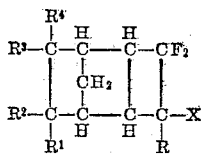

where R$^1$ and R$^2$ are hydrogen, alkyl groups of no more than 6 carbons, carboxyl groups or groups hydrolyzable thereto; X is a halogen of atomic number 9 through 17, an omega-hydroperfluoroalkyl group or a perfluoroalkyl group of not more than 6 carbons; and R is a halogen of atomic number 9 through 17. These compounds are preferred since they can be pyrolyzed to fluorobutadienes.

The following examples illustrate the compounds of this invention:

4,8-dichloro-3,3,4,8,9,9-hexafluorotetracyclo-
[4.4.1.0$^{2,5}$0$^{7,10}$]undecane
4,8-dibromo-3,3,4,8,9,9-hexafluorotetracyclo-
[4.4.1.0$^{2,5}$0$^{7,10}$]undecane
4-bromo-8-cyano-3,3,4-trifluorotricyclo-
[4.2.1.0$^{2,5}$]nonane
4-chloro-7-carboxy-3,3,4-trifluorotricyclo-
[4.2.1.0$^{2,5}$]nonane
4-chloro-3,3,4-trifluoro-7,8-dipropoxycarbonyl-
tricyclo[4.2.1.0$^{2,5}$]nonane
3,3,4-trifluoro-8-octyltricyclo[4.2.1.0$^{2,5}$]nonane
4-bromo-8-cyano-3,3,4-trifluorotricyclo-
[4.2.1.0$^{2,5}$]non-7-ene
8-carboxy-3,3,4-tetrafluorotricyclo-
[4.2.1.0$^{2,5}$]non-7-ene
8-butyl-4,4-dichloro-3,3-difluorotricyclo-
[4.2.1.0$^{2,5}$]non-7-ene
7-cyclohexyl-3,3,4,4-tetrafluorotricyclo-
[4.2.1.0$^{2,5}$]non-7-ene
7-phenyl-4,4-dichloro-3,3-difluorotricyclo-
[4.2.1.0$^{2,5}$]non-7-ene
7,8-dibutoxycarbonyl-3,3,4,4-tetrafluorotricyclo
[4.2.1.0$^{2,5}$]non-7-ene
4-methyl-3,3,4-trifluorotricyclo[4.2.1.0$^{2,5}$]non-7-ene
4-decyl-3,3,4-trifluorotricyclo[4.2.1.0$^{2,5}$]non-7-ene
4-chloromethyl-3,3,4-trifluorotricyclo-
[4.2.1.0$^{2,5}$]non-7-ene
4-(6H-dodecafluorohexyl)-3,3,4-trifluorotricyclo-
[4.2.1.0$^{2,5}$]non-7-ene
4-perfluoropropyl-3,3,4-trifluorotricyclo-
[4.2.1.0$^{2,5}$]non-7-ene
8-phenylcarbamyl-4,4-dichloro-3,3-difluorotricyclo-
[4.2.1.0$^{2,5}$]non-7-ene The compounds of this invention are prepared by reacting a fluoroolefin as defined below with a bicyclic compound which has two fused rings of 5 carbons each, which rings have 3 carbons in common and which further have at least one double bond between two of the non-common carbons of said rings.

The bicyclic compounds are further characterized as follows:

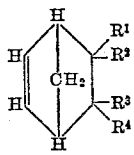

where the $R^1$, $R^2$, $R^3$ and $R^4$ groups are hydrogen, hydrocarbon, carboxyl, or groups hydrolyzable thereto and where $R^2$ and $R^3$ can together form one-half of a double bond. When the $R^1$, $R^2$, $R^3$ or $R^4$ groups are hydrocarbon, they contain preferably not more than 12 carbon atoms and can be aliphatic (octyl), cycloaliphatic (cyclohexyl) aralkyl (benzyl), and aryl (phenyl).

The preferred bicyclic compounds used as one reactant in the process of this invention are bicyclo-[2.2.1]hepta-2,5-dienes having the structure

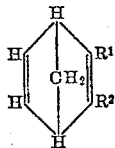

where $R^1$ and $R^2$ are hydrogen, alkyl groups of not more than 6 carbons or carboxyl groups or groups hydrolyzable thereto. Examples of hydrolyzable $R^1$ and $R^2$ groups are cyano, ethoxycarbonyl and dimethylcarbamyl.

The fluoroolefin used in the novel process is an olefin of not more than 12 carbons which has as its only aliphatic unsaturation a terminal double bond. The terminal carbon of the olefinic or ethylenic linkage is bonded to two fluorine atoms and the remaining carbon of the olefinic linkage is singly bonded on the one hand to a halogen of atomic number no greater than 35, an omega-hydroperfluoroalkyl group of no more than 10 carbons, or a perfluoroalkyl group of no more than 10 carbons; and, on the other hand, is singly bonded to hydrogen, a halogen of atomic number no greater than 35, an alkyl group, an omega-hydroperfluoroalkyl group, a perfluoroalkyl group, or a haloalkyl group wherein the halogen is of atomic number no greater than 35, in which said alkyl, fluoroalkyl or haloalkyl groups have at most 10 carbons.

The fluoroolefins used in the preparation of these novel compounds have the general structure:

wherein X is a halogen of atomic number no greater than 35, an omega-hydroperfluoroalkyl group of no more than 10 carbons, or a perfluoroalkyl group of no more than 10 carbons; R is X, hydrogen, an alkyl group, or a haloalkyl group wherein the halogen is of atomic number no greater than 35, in which said alkyl and haloalkyl groups have at most 10 carbons, but preferably R is hydrogen or has the same significance as X.

In the preferred fluoroolefins X is a halogen of atomic number 9 to 17, an omega-hydroperfluoroalkyl group of not more than 6 carbons or a perfluoroalkyl group of not more than 6 carbons; and R is a halogen of atomic number 9 through 17.

The starting materials used to prepare the compounds of this invention are commercially available or are easily prepared. Chlorotrifluoroethylene and tetrafluoroethylene are examples of available fluoroolefins. The bicyclic unsaturated compounds are readily prepared by a Diels-Alder reaction of an appropriate olefin with a cyclopentadiene as described in Organic Reactions, vol. IV, pages 75 ff., John Wiley and Sons, New York (1948). For example, 2-cyanobicyclo[2.2.1]-hept-5-ene can be prepared by reacting cyclopentadiene with acrylonitrile; bicyclo[2.2.1]hept-2-ene can be prepared from cyclopentadiene and ethylene. A preferred class of reactants, the bicyclo[2.2.1]hepta-2,5-dienes, can be prepared as described in British Patent 701,211 from acetylene and a cyclopentadiene.

The reaction between the bicyclic compound and the polyfluoroolefin is carried out under pressure in a closed reaction vessel which is lined with an inert material such as glass, platinum or stainless steel. Most conveniently, the reaction proceeds under autogenous pressure but greater pressures can also be used.

The vessel is charged with the bicyclic compound, chilled and then purged with an inert gas, for example, nitrogen, or evacuated to a few millimeters pressure to remove as much oxygen as possible. Preferably a small amount of a polymerization inhibitor for fluoroolefins is charged into the tube. Suitable polymerization inhibitors are described in U.S. Patents 2,407,396; 2,407,405; and 2,407,419.

After chilling and evacuating, the polyfluoroolefin is charged into the reaction vessel which is sealed and heated to a temperature of 125–250° C. The temperature should be sufficiently high to permit the reaction to reach completion in a reasonable time but below the decomposition temperature of the reactants. The preferred temperature lies between 150° and 200° C.

The time for the reaction to reach completion generally lies between 5 and 25 hours; preferably, the reaction is allowed to proceed for 8–20 hours.

The proportions in which the reactants are used are determined by the number of double bonds in the bicyclic compounds with which it is desired to react. The reactants are used in approximately equimolar ratios when one double bond in the bicyclic compound is involved; for reaction with a bicyclic compound in which two double bonds are involved, the molar ratio of fluoroolefin to bicyclic compound is approximately 2:1. Preferably the fluoroolefin is used in slight excess over the quantity theoretically required in order to assure a good yield of the desired tri- or tetracyclic product. When used in lesser quantities than theoretically required, lower yields are obtained.

The reaction can be conveniently carried out in the presence of an inert solvent, for example, pentane. However, such a solvent is by no means necessary, and good results are obtained even in the absence of any solvent.

The preparation and properties of typical compounds of this invention are given in the following examples.

*Example 1*

A bomb lined with stainless steel (capacity, 145 ml.) was charged with 46 g. of bicyclo[2.2.1]hepta-2,5-diene, 31 ml. of pentane, 0.5 g. of hydroquinone, and 3 drops of "Terpene B" hydrocarbon mixture. This mixture is a terpene fraction consisting principally of dipentene and terpinolene boiling at 176–196° C., having an $n_D^{20}$ of 1.470–1.478 and a density of 0.855–0.870 at 15.5° C. The tube and contents were then chilled in a solid carbon dioxide-acetone bath, evacuated to about 10 mm. pressure and charged with 40 g. of tetrafluoroethylene. The tube was then sealed and heated for 8 hours at 180° C. The crude liquid product from four runs was combined and distilled to yield 199 g. of 3,3,4,4-tetrafluorotricyclo-[4.2.1.0$^{2,5}$]non-7-ene; B.P. 76° C./50 mm.; $n_D^{25}$, 1.4165.

In another experiment four hard glass (Carius) tubes (150 ml. capacity) were cooled in liquid nitrogen, evacuated to approximately 1 mm. pressure and each charged with 20 g. of bicyclo[2.2.1]hepta-2,5-diene and 16 g. of tetrafluoroethylene. The tubes were sealed and heated to 150° C. for 10.5 hours. After cooling and opening the tubes, the contents were combined to yield 143 g. of crude liquid product. This product was fractionally distilled under reduced pressure to give 106 g. of 3,3,4,4-tetrafluorotricyclo[4.2.1.0$^{2,5}$]non-7-ene; B.P. 152° C. (approximately 60° C. at 20 mm. pressure), $n_D^{25}$=1.4160.

Anal.—Calc'd for $C_9H_8F_4$: F, 39.6%. Found: F, 39.54%.

There was also obtained in this experiment a small quantity of a solid product which, on crystallization from cyclohexane, melted at 151–152° C. This compound was 3,3,4,4,8,8,9,9-octafluorotetracyclo[4.4.1.0$^{2,5}$0$^{7,10}$]-undecane. Its preparation in higher yield from the intermediate tricyclic non-7-ene is described in the following paragraph.

Each of four Carius tubes was charged, as described above, with 20.4 g. of 3,3,4,4-tetrafluorotricyclo [4.2.1.0$^{2,5}$]non-7-ene and 13 g. of tetrafluoroethylene. The tubes were sealed and heated 12 hours at 175° C. After cooling and opening, the free liquid was decanted from the solid in the tubes and the solid rinsed with hexane. There was obtained from the four tubes 27.9 g. of white crystals, which, when crystallized from cyclohexane, melted at 151–152° C. This compound, 3,3,4,4,8,8,9,9-octafluorotetracyclo[4.4.1.0$^{2,5}$0$^{7,10}$]undecane, gave the following data on analysis.

Anal.—Calc'd for $C_{11}H_8F_8$: F, 52.1%. Found: F, 50.48%.

Example 2

Each of three Carius tubes was charged as in Example 1 with 20 g. of bicyclo[2.2.1]hepta-2,5-diene and 20 g. of chlorotrifluoroethylene. After sealing, the tubes were heated to 175° C. for 9.5 hours. The combined products of the three tubes were processed as in Example 1 to yield 89.4 g. of 4-chloro-3,3,4-trifluorotricyclo-[4.2.1.0$^{2,5}$]non-7-ene, boiling point 85° C. at 30 mm. pressure; $n_D^{25}$=1.4548.

Anal.—Calc'd for $C_9H_8F_3Cl$: Cl, 17.0%. Found: Cl, 16.85%.

Example 3

A Carius tube was charged with 10 g. of bicyclo[2.2.1] hepta-2,5-diene and 27 g. of 1,1-dichloro-2,2-difluoroethylene, sealed and heated for 8 hours at 175° C. The tube was opened and the contents filtered to remove a small quantity of solid material. The liquid filtrate was distilled to yield 17.6 g. of 4,4-dichloro-3,3-difluorotricyclo[4.2.1.0$^{2,5}$]non-7-ene, B.P. 69° C./4 mm.; $n_D^{26}$, 1.4905.

Anal.—Calc'd for $C_9H_8F_2Cl_2$: F, 16.9%; Cl, 31.5%. Found: F, 16.8%; Cl, 31.3%.

There was also obtained 3.5 g. of liquid boiling at 132° C./4 mm. which on crystallization from methanol gave 2 g. of white solid, which melted from 136–170° C. The compound was a mixture of isomers of tetrachlorotetrafluorotetracyclo[4.4.1.0$^{2,5}$0$^{7,10}$]undecane in which the halogens are bonded to the carbons in the 3, 4, 8 and 9 positions. An example of one isomer is 4,4,9,9-tetrachloro - 3,3,8,8-tetrafluorotetracyclo[4.4.1.0$^{2,5}$0$^{7,10}$] undecane.

Anal.—Calc'd for $C_{11}H_8F_4Cl_4$: F, 21.2%; Cl, 39.7%. Found: F, 21.12%; Cl, 39.21%.

Example 4

A Carius tube was charged as in Example 1 with 10 g. of bicyclo[2.2.1]hepta-2,5-diene and 18 g. of perfluoropropene. It was sealed and heated 8 hours at 175° C. and 8 hours at 200° C. The liquid reaction product was distilled under reduced pressure to yield 12 g. of 4-trifluoromethyl - 3,3,4 - trifluorotricyclo[4.2.1.0$^{2,5}$]non - 7-ene; B.P. 62° C./20 mm.; $n_D^{26}$, 1.3950.

Anal.—Calc'd for $C_{10}H_8F_6$: F, 47.2%. Found: F, 45.9%.

Example 5

A bomb lined with stainless steel, similar to that described in Example 1, was charged with 125 g. of dimethyl bicyclo[2.2.1]hepta-2,5-diene-2,3-dicarboxylate, 0.5 g. of hydroquinone and 3 drops of "Terpene B" hydrocarbon mixture. The bomb and contents were chilled and evacuated as described in Example 1 and charged with 40 g. of tetrafluoroethylene. After sealing, the bomb was heated with shaking for 8 hours at 185° C. under autogenous pressure. The crude reaction product was distilled to yield 48.6 g. of 3,3,4,4-tetrafluoro-7,8-dimethoxycarbonyltricyclo[4.2.1.0$^{2,5}$]non-7-ene, boiling at 120–122° C. at 0.28 mm. The product became solid on standing; after crystallization from pentane, it melted at 60–65° C.

Anal.—Calc'd for $C_{13}H_{12}O_4F_4$: C, 50.60%; H, 3.92%; F, 23.70%. Found: C, 51.03%; H, 4.10%; F, 24.45%.

Examples 1–5 illustrate the reaction of bicyclodienes with fluoroolefins to yield principally tricyclic compounds which have one olefinic bond. Examples 1 and 3 also illustrate the preparation of saturated tetracyclic products.

Example 6

A bomb lined with stainless steel, similar to that described in Example 1, was charged with 39 g. of bicyclo[2.2.1]hept-2-ene, 20 ml. of pentane and 3 drops of "Terpene B" hydrocarbon mixture. The tube and contents were then chilled in a solid carbon dioxide-acetone bath, evacuated to about 10 mm. pressure and charged with 40 g. of tetrafluoroethylene. The tube was sealed and heated with mechanical shaking for 8 hours at 190° C. under autogenous pressure. The crude liquid product obtained from four runs was combined and distilled to yield 139 g. of 3,3,4,4 - tetrafluorotricyclo[4.2.1.0$^{2,5}$]nonane, boiling at 164–165° C. at atmospheric pressure and 101–102° C. at 99 mm.; $n_D^{25}$, 1.4133.

Anal.—Calc'd for $C_9H_{10}F_4$: C, 55.66%; H, 5.20%. Found: C, 56.51%; H, 5.51%.

Example 7

A bomb similar to that described in Example 1 was charged with 126 g. of dimethyl bicyclo[2.2.1]hept-5-ene-2,3-dicarboxylate, 0.5 g. of hydroquinone and 3 drops of "Terpene B" hydrocarbon mixture. The bomb and contents were chilled in solid carbon dioxide-acetone mixture, evacuated to 10 mm. pressure and charged with 40 g. of tetrafluoroethylene. The bomb was closed and heated with shaking for 8 hours at 185° C. under autogenous pressure. The crude reaction mixture was distilled to yield 19.3 g. of 3,3,4,4-tetrafluoro-7,8-dimethoxycarbonyltricyclo[4.2.1.0$^{2,5}$]nonane, boiling at 137° C. at 0.7 mm. pressure. The compound solidified on standing; on crystallization from a cyclohexane-pentane mixture (3:1 ratio by volume) the solid product melted at 147–151° C. The analytical data obtained are as follows:

Anal.—Calc'd for $C_{13}H_{14}O_4F_4$: C, 50.3%; H, 4.55%; F, 24.5%. Found: C, 51.18%; H, 4.57%; F, 23.9%.

Example 8

Four Carius tubes, each of 130 ml. capacity, were charged as described in Example 1 with 24 g. of 2-cyanobicyclo[2.2.1]hept-5-ene and 13 g. of tetrafluoroethylene. The sealed tubes were heated for 8 hours at 175° C. The crude reaction products were combined and distilled to yield 28.6 g. of 8-cyano-3,3,4,4-tetrafluorotricyclo[4.2.1.0$^{2,5}$]nonane, boiling at 137° C. at 14 mm. pressure. The product solidified on standing and was crystallized from cyclohexane. The solid product (a mixture of stereoisomers) had a melting point of 68–76° C.

Anal.—Calc'd for $C_{10}H_9NF_4$: F, 34.7%. Found: F, 34.6%.

Example 9

Three Carius tubes, each of 130 ml. capacity, were charged as in Example 1 with a total of 46 g. of 2-cyano-2-methylbicyclo[2.2.1]hept-5-ene and 39 g. of tetrafluoroethylene. The sealed tubes were heated for 15 hours at 175° C. The crude reaction product was distilled to yield 16 g. of 8-cyano-3,3,4,4-tetrafluoro-8-methyltricyclo[4.2.1.0$^{2,5}$]nonane, boiling at 140–150° C. at 11 mm. pressure. It solidified on standing and was crystallized from cyclohexane to yield a product melting at 93–94° C.

*Anal.*—Calc'd for $C_{11}H_{11}NF_4$: F, 32.6%. Found: F, 32.47%.

The compounds in the preceding examples are prepared by a batch process which is the preferred procedure. They can also be prepared by a continuous process wherein the bicyclic compound in admixture with a fluoroolefin is caused to flow as a vapor through a thermal zone, for example, a packed tube heated to 150–500° C., to effect partial conversion to a fluorinated tricyclic or tetracyclic product. In a continuous process the unreacted portion of the components can be recirculated to obtain increased conversion to the desired fluorocarbon compound.

The compounds of this invention are liquids or low melting solids of pleasant odor. They are soluble in gasoline and kerosene and are thermally stable. They can be refluxed at atmospheric pressure without formation of corrosive products and are useful as heat exchange media where control of temperature is desired.

A preferred class of compounds, the 3,3-difluoro-4-halotricyclo[4.2.1.0$^{2,5}$]non-7-enes, are particularly useful as intermediates for the preparation of polyfluorobutadienes which on polymerization, form tough stable polymers. The following examples illustrate the pyrolysis of the tricyclic nonenes to polyfluorobutadienes.

*Example A*

This example illustrates the pyrolysis of 3,3,4,4-tetrafluorotricyclo[4.2.1.0$^{2,5}$]non-7-ene to yield 1,1,4,4-tetrafluorobutadiene.

The reactor consisted of a heat-resistant glass tube (the type of glass known commercially as "Vycor") 13/16" in diameter (inside) and 20.5" long, packed with 6-mm. sections of quartz tubing 6 mm. in diameter. The packed and heated zone was 12 inches long. The reaction tube was heated externally by means of a cylindrical electric furnace and the temperature was recorded by a thermocouple placed in the center of the reaction tube. A high capacity vacuum pump maintained the reaction system at the desired reduced pressure. The compound to be pyrolyzed was introduced into the reaction zone gradually by a dropping funnel and the reaction products were condensed in a trap which was cooled sufficiently to condense the by-products at the pressure employed.

The reactor was heated to 700° C., evacuated to 1 mm. pressure and 25 g. of 3,3,4,4-tetrafluorotricyclo[4.2.1.0$^{2,5}$]non-7-ene passed through in 15 minutes. The pyrolysis products were distilled and separated into two fractions, boiling at 8° C. and 40° C. The fraction boiling at 8° C. was tetrafluorobutadiene which was reacted with bromine to give 16.7 g. of 1,4-dibromo-1,1,4,4-tetrafluorobutene-2. The fraction boiling at 40° C. and weighing 4.6 g. was identified as cyclopentadiene.

*Example B*

This example illustrates the pyrolysis of 4-chloro-3,3,4-trifluorotricyclo[4.2.1.0$^{2,5}$]non-7-ene to yield 1-chloro-1,4,4-trifluorobutadiene.

The reactor described in Example A was heated to 700° C., evacuated to 1 mm. pressure and 25 g. of 3-chloro-3,4,4-trifluorotricyclo[4.2.1.0$^{2,5}$]non-7-ene passed through in 15 minutes. Distillation of the pyrolysis products gave 10.6 g. of 1-chloro-1,4,4-trifluorobutadiene, boiling at 48° C., $n_D^{30}=1.3830$. There was also obtained 7.6 g. of cyclopentadiene, boiling at 40° C.

Using the procedure given in Example A, the compound of Example 3, namely, 4,4-dichloro-3,3-difluoro-tricyclo[4.2.1.0$^{2,5}$]non-7-ene, can be pyrolyzed to give 1,1-dichloro-4,4-difluorobutadiene and cyclopentadiene; the compound of Example 4, namely, 4-trifluoromethyl-3,3,4-trifluorotricyclo[4.2.1.0$^{2,5}$]non-7-ene yields 1,1,1,2,5,5-hexafluoropenta-2,4-diene.

*Example C*

This example illustrates the use of 3,3,4,4-tetrafluorotricyclo[4.2.1.0$^{2,5}$]nonane as a spotting agent.

A piece of white cotton fabric on which there was a spot caused by contact with lubricating oil was placed on blotting paper and 3 cc. of 3,3,4,4-tetrafluorotricyclo[4.2.1.0$^{2,5}$]nonane added dropwise on the spot. The cloth was covered a few minutes with blotting paper and then dried in the air. No evidence of the stain remained on the fabric.

*Example D*

This example illustrates the various qualities of 3,3,4,4,8,8,9,9-octafluorotetracyclo[4.4.1.0$^{2,5}$.0$^{7,10}$]undecane making it useful as a heat exchange medium.

A 5-g. sample of 3,3,4,4,8,8,9,9-octafluorotetracyclo[4.4.1.0$^{2,5}$.0$^{7,10}$]undecane was placed in a large test tube open to the air and heated to refluxing for six hours. No color developed in the product indicating there was no decomposition.

What is claimed is:

1. A compound of the following structural formula:

$$\begin{array}{c} R^4 \\ | \quad H \quad H \\ R^3-C-C-C-CF_2 \\ | \quad | \quad | \\ \quad CH_2 \\ | \quad | \quad | \\ R^2-C-C-C-C-X \\ | \quad H \quad H \quad | \\ R^1 \qquad\qquad R \end{array}$$

wherein $R^1$, $R^2$, $R^3$, and $R^4$ are members of the group consisting of hydrogen, hydrocarbon, carboxyl and groups hydrolyzable thereto, with the proviso that $R^2$ and $R^3$ can together represent the divalent group, $$-[CF_2-CX(R)]_n-$$

wherein $n$ is a cardinal number less than 2, that is, when $n$ is 0, $R^2$ and $R^3$ together form one-half a double bond; X is selected from the group consisting of fluorine, chlorine, bromine, omega-hydroperfluoroalkyl of up to 10 carbon atoms and perfluoroalkyl of up to 10 carbon atoms; and R is selected from the group consisting of fluorine, chlorine, bromine, hydrogen, alkyl of up to 10 carbon atoms and fluoro-, chloro- and bromoalkyl of up to 10 carbon atoms, said compound being prepared by reacting at a temperature of from 125–250° C. and under superatmospheric pressure a fluoroolefin of the formula $$\begin{array}{c} F-C-F \\ \parallel \\ R-C-X \end{array}$$

wherein R and X have the same significance as above, with a bicyclic compound of the formula $$\begin{array}{c} H \quad R^1 \\ \diagup \quad R^3 \\ CH_2 \\ H \quad R^3 \\ \diagdown \quad R^4 \\ H \end{array}$$

wherein $R^1$, $R^2$, $R^3$ and $R^4$ have the same significance as above.

2. A 3,3-difluoro-4-halotricyclo[4.2.1.0$^{2,5}$]nonane selected from the class consisting of 3,3,4,4-tetrafluorotricyclo[4.2.1.0$^{2,5}$]nonane having a boiling point of 164–165° C. and represented by the formula $$\begin{array}{c} H \quad H \quad H \\ HC-C-C-CF_2 \\ | \quad | \quad | \\ \quad CH_2 \\ | \quad | \quad | \\ HC-C-C-CF_2 \\ H \quad H \quad H \end{array}$$

3,3,4,4 - tetrafluoro - 7,8 - dimethoxycarbonyltricyclo-[4.2.1.0²,⁵]nonane, having a boiling point of 137° C. at 0.7 mm. pressure and represented by the formula

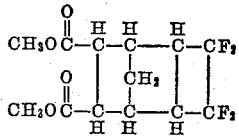

and 8 - cyano - 3,3,4,4 - tetrafluoro - 8 - methyltricyclo-[4.2.1.0²,⁵]nonane, having a melting point of 93–94° C. and represented by the formula

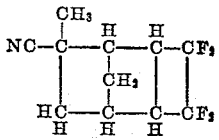

3. A 3,3, - difluoro-4-halotricyclo[4.2.1.0²,⁵]non-7-ene selected from the class consisting of 3,3,4,4-tetrafluorotricyclo[4.2.1.0²,⁵]non-7-ene, having a boiling point of 152° C. and represented by the formula

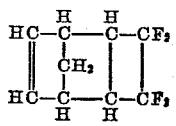

4-chloro-3,3,4-trifluorotricyclo[4.2.1.0²,⁵]non-7-ene, having a boiling point of 85° C. at 30 mm. pressure and represented by the formula

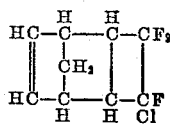

4,4 - dichloro - 3,3 - difluorotricyclo[4.2.1.0²,⁵]non-7-ene, having a boiling point of 69° C. at 4 mm. pressure and represented by the formula

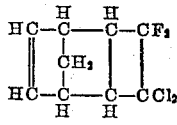

4 - trifluoromethyl - 3,3,4 - trifluorotricyclo[4.2.1.0²,⁵]-non-7-ene, having a boiling point of 62° C. at 20 mm. pressure and represented by the formula

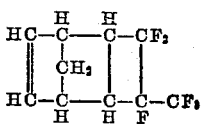

and 3,3,4,4 - tetrafluoro-7,8-dimethoxycarbonyltricyclo-[4.2.1.0²,⁵]non-7-ene, having a boiling range of 120–122° C. at 0.28 mm. pressure and represented by the formula

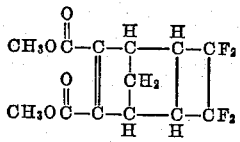

4. The preparation of polycyclic compounds which comprises reacting at a temperature of from 125 to 250° C. and under superatmospheric pressure a fluoroolefin of the formula

wherein X is selected from the group consisting of fluorine, bromine, chlorine, omega-hydroperfluoroalkyl of at most 10 carbon atoms and perfluoroalkyl of at most 10 carbon atoms; R is a member of the group consisting of fluorine, chlorine, bromine, hydrogen, alkyl and fluoro-, chloro- and bromoalkyl of at most 10 carbon atoms with a bicyclic compound of the formula

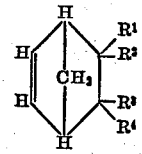

wherein $R^1$, $R^2$, $R^3$ and $R^4$ are selected from the group consisting of hydrogen, hydrocarbon, carboxyl and groups hydrolyzable thereto with the proviso that $R^2$ and $R^3$ can together form one-half of a double bond.

5. 3,3,4,4,8,8,9,9 - octafluorotetracyclo[4.4.1.0²,⁵0⁷,¹⁰]-undecane, having a melting point of 151–152° C. and represented by the formula

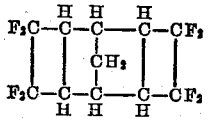

6. Isomeric mixture of tetrachlorotetrafluorotetracyclo[4.4.1.0²,⁵0⁷,¹⁰]undecanes in which the halogens are bonded to the carbons in the 3, 4, 8 and 9 positions, said mixture being a white solid melting from 136–170° C.

7. A stereoisomeric mixture of 8-cyano-3,3,4,4-tetrafluorotricyclo[4.2.1.0²,⁵]nonanes, said mixture being a solid having a melting range of 68–76° C.

References Cited in the file of this patent

UNITED STATES PATENTS

| | | |
|---|---|---|
| 2,462,345 | Barrick | Feb. 22, 1949 |
| 2,676,132 | Bluestone | Apr. 20, 1954 |
| 2,730,548 | Bluestone et al. | Jan. 10, 1956 |

UNITED STATES PATENT OFFICE
CERTIFICATE OF CORRECTION

Patent No. 2,928,865                  March 15, 1960

Wallace R. Brasen

It is hereby certified that error appears in the printed specification of the above numbered patent requiring correction and that the said Letters Patent should read as corrected below.

Column 2, line 7, for "Where" read -- When --; line 53, for "8-carboxy-3,3,4-" read -- 8-carboxy-3,3,4,4- --; column 4, lines 40 and 41, for "fluorolefin" read -- fluoroolefin --; column 5, line 5, for "$C_6H_8F_4$" read -- $C_9H_8F_4$ --.

Signed and sealed this 13th day of September 1960.

(SEAL)
Attest:

KARL H. AXLINE                  ROBERT C. WATSON
Attesting Officer                Commissioner of Patents